United States Patent
Bei et al.

(10) Patent No.: US 9,157,373 B2
(45) Date of Patent: Oct. 13, 2015

(54) METHODS AND DEVICES FOR LOW SPEED LOW TORQUE TESTING OF A ROTOR IN A TURBOMACHINERY

(75) Inventors: Simone Bei, Prato (IT); Andrea Casoni, Florence (IT); Gianni Bagni, Calenzano (IT); Daniele Benericetti, Fucecchio (IT); Guiseppe D'Alessandro, Florence (IT)

(73) Assignee: Nuovo Pignone, S.P.A., Florence (IT)

( * ) Notice: Subject to any disclaimer, the term of this patent is extended or adjusted under 35 U.S.C. 154(b) by 501 days.

(21) Appl. No.: 13/226,069

(22) Filed: Sep. 6, 2011

(65) Prior Publication Data

US 2012/0063883 A1    Mar. 15, 2012

(30) Foreign Application Priority Data

Sep. 9, 2010    (IT) .............................. MI2010A1638

(51) Int. Cl.
*F01D 21/00* (2006.01)
*F02C 7/275* (2006.01)
*F02C 9/00* (2006.01)

(52) U.S. Cl.
CPC .............. *F02C 7/275* (2013.01); *F01D 21/003* (2013.01); *F02C 9/00* (2013.01); *F05D 2260/80* (2013.01); *F05D 2260/85* (2013.01); *F05D 2270/02* (2013.01); *F05D 2270/304* (2013.01)

(58) Field of Classification Search
CPC ....... F01D 19/00; F01D 21/003; F02C 7/275; F02C 7/277; F05D 2260/85; F05D 2270/02
USPC ........ 415/13, 16, 19, 118; 73/112.01, 112.03, 73/114.77
See application file for complete search history.

(56) References Cited

U.S. PATENT DOCUMENTS

| | | | | |
|---|---|---|---|---|
| 2,953,127 A | * | 9/1960 | Adams et al. ............ | 123/179.31 |
| 3,168,892 A | | 2/1965 | Quenneville | |
| 3,274,855 A | * | 9/1966 | Reynolds et al. ............... | 475/77 |
| 3,793,826 A | * | 2/1974 | Holleboom et al. ............ | 60/787 |
| 3,951,008 A | * | 4/1976 | Schneider et al. .............. | 74/661 |

(Continued)

FOREIGN PATENT DOCUMENTS

| | | |
|---|---|---|
| CA | 2117004 | 3/1993 |
| CN | 101503977 A | 8/2009 |

(Continued)

OTHER PUBLICATIONS

JP2002-357128A English Machine Translation.*

(Continued)

*Primary Examiner* — Nathaniel Wiehe
*Assistant Examiner* — Wayne A Lambert
(74) *Attorney, Agent, or Firm* — GE Global Patent Operation

(57) ABSTRACT

Methods and devices for performing a low torque low speed test to determine whether a rotor of a turbomachinery is free to rotate are provided. A method includes automatically applying a torque to the rotor, the torque gradually increasing up to a predetermined torque value. The method further includes monitoring the speed of the rotor while the torque is gradually increased. The method also includes outputting an indication that the rotor is free to rotate after the speed of the rotor becomes positive, or outputting an indication that the rotor is locked when the speed of the rotor remains zero and the applied torque has reached the predetermined torque value.

16 Claims, 13 Drawing Sheets

(56) References Cited

U.S. PATENT DOCUMENTS

| | | | | |
|---|---|---|---|---|
| 3,959,635 A * | 5/1976 | Tanco | ............................ | 700/290 |
| 4,044,551 A * | 8/1977 | Nelson et al. | .................... | 60/790 |
| 4,694,689 A * | 9/1987 | Kawasaki | ................... | 73/114.77 |
| 4,743,776 A * | 5/1988 | Baehler et al. | .................... | 290/31 |
| 4,891,971 A * | 1/1990 | Jones et al. | ................. | 73/112.01 |
| 5,107,674 A * | 4/1992 | Wibbelsman et al. | ........... | 60/778 |
| 5,123,239 A | 6/1992 | Rodgers | | |
| 5,315,817 A | 5/1994 | Vannini et al. | | |
| 5,363,317 A * | 11/1994 | Rice et al. | ......................... | 702/34 |
| 5,435,125 A * | 7/1995 | Telakowski | ...................... | 60/788 |
| 5,555,722 A * | 9/1996 | Mehr-Ayin et al. | .............. | 60/788 |
| 5,722,228 A * | 3/1998 | Lampe et al. | .................... | 60/778 |
| 6,293,085 B2 * | 9/2001 | Thompson et al. | .............. | 60/773 |
| 6,343,251 B1 | 1/2002 | Herron et al. | | |
| 6,358,186 B1 * | 3/2002 | Kosik et al. | .................... | 477/176 |
| 6,949,922 B2 | 9/2005 | Twerdochlib et al. | | |
| 7,142,131 B2 * | 11/2006 | Sikora | ............................ | 340/971 |
| 7,332,884 B2 * | 2/2008 | Rozman et al. | ................ | 318/432 |
| 7,506,517 B2 * | 3/2009 | Uluyol et al. | .................... | 60/786 |
| 7,742,881 B2 | 6/2010 | Muralidharan et al. | | |
| 8,261,864 B2 * | 9/2012 | Bhattarai et al. | ........... | 180/65.285 |
| 8,448,445 B2 | 5/2013 | Botarelli | | |
| 2005/0261820 A1 * | 11/2005 | Feeney et al. | .................. | 701/100 |
| 2007/0084214 A1 * | 4/2007 | Schmidt et al. | .................. | 60/778 |
| 2009/0069998 A1 * | 3/2009 | Mehrer et al. | ................. | 701/100 |
| 2009/0261989 A1 * | 10/2009 | Eick | ................................ | 340/963 |

FOREIGN PATENT DOCUMENTS

| | | |
|---|---|---|
| EP | 0623741 A1 | 11/1994 |
| EP | 1247961 A2 | 10/2002 |
| EP | 1247961 A3 | 3/2004 |
| EP | 1617553 A2 | 1/2006 |
| EP | 1617553 A3 | 1/2008 |
| EP | 2110516 A2 | 10/2009 |
| EP | 2213843 A2 | 8/2010 |
| GB | 2241538 A | 9/1991 |
| JP | 60195333 A | 10/1985 |
| JP | 07253030 A | 10/1995 |
| JP | 10169466 A | 6/1998 |
| JP | 20021063262 B2 | 4/2002 |
| JP | 2002357128 A * | 12/2002 |
| JP | 2005291083 A | 10/2005 |
| JP | 4169952 B2 | 10/2008 |
| RU | 2008131963 A | 2/2010 |
| SU | 415397 A1 | 2/1974 |
| WO | 2008134856 A1 | 11/2008 |

OTHER PUBLICATIONS

Italian Search Report dated May 11, 2011 for Italian Priority Application MI2010A001638 filed on Sep. 9, 2010.

Unofficial English translation of Office Action issued in connection with corresponding CN Application No. 201110347696.1 on Aug. 29, 2014.

Notice of Allowance issued in connection with corresponding RU Application No. 2011137053 on Jul. 14, 2015.

Unofficial Translation of Office Action issued in connection with corresponding JP Application No. 2011-195909 on Jul. 28, 2015.

* cited by examiner

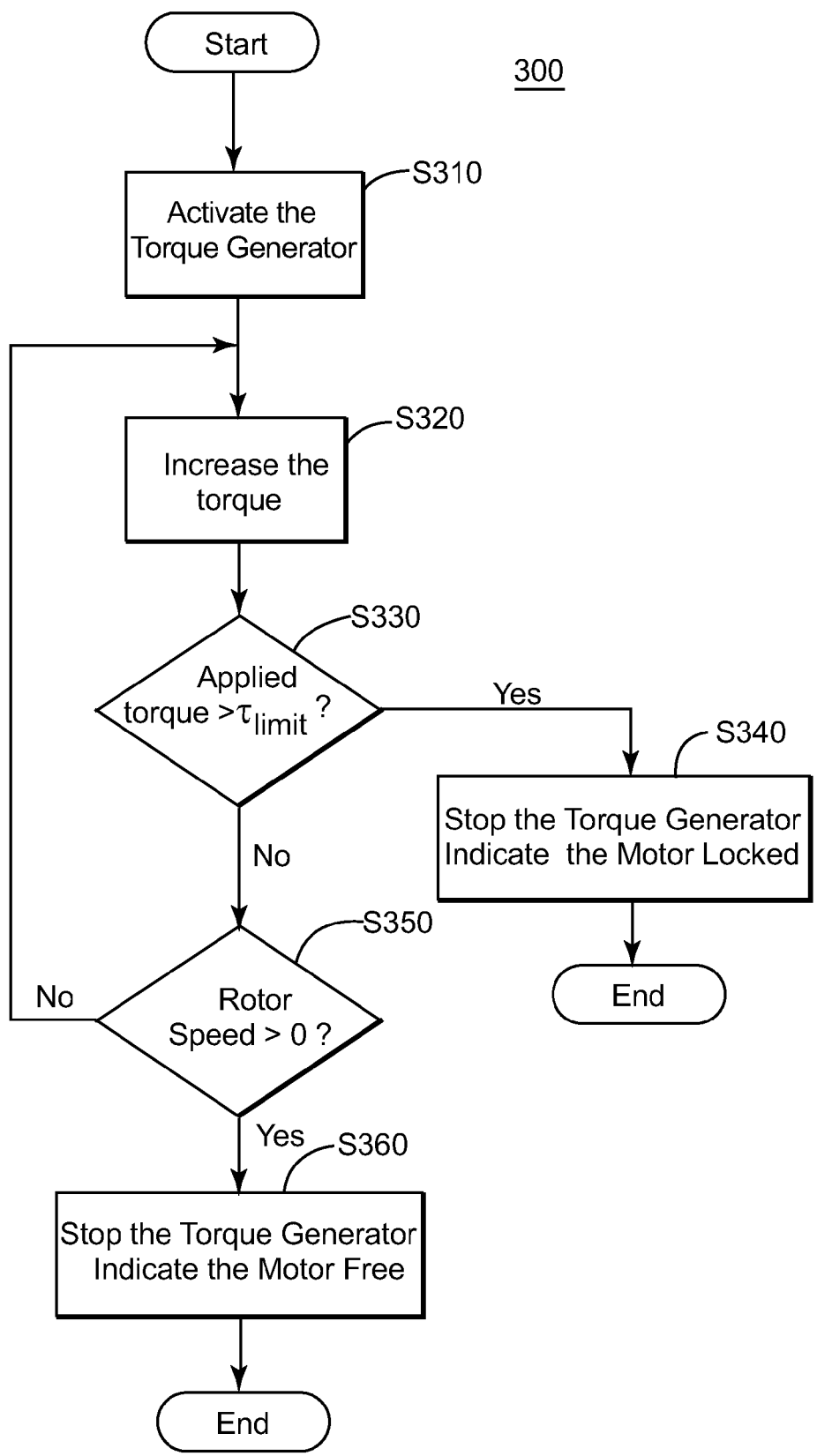

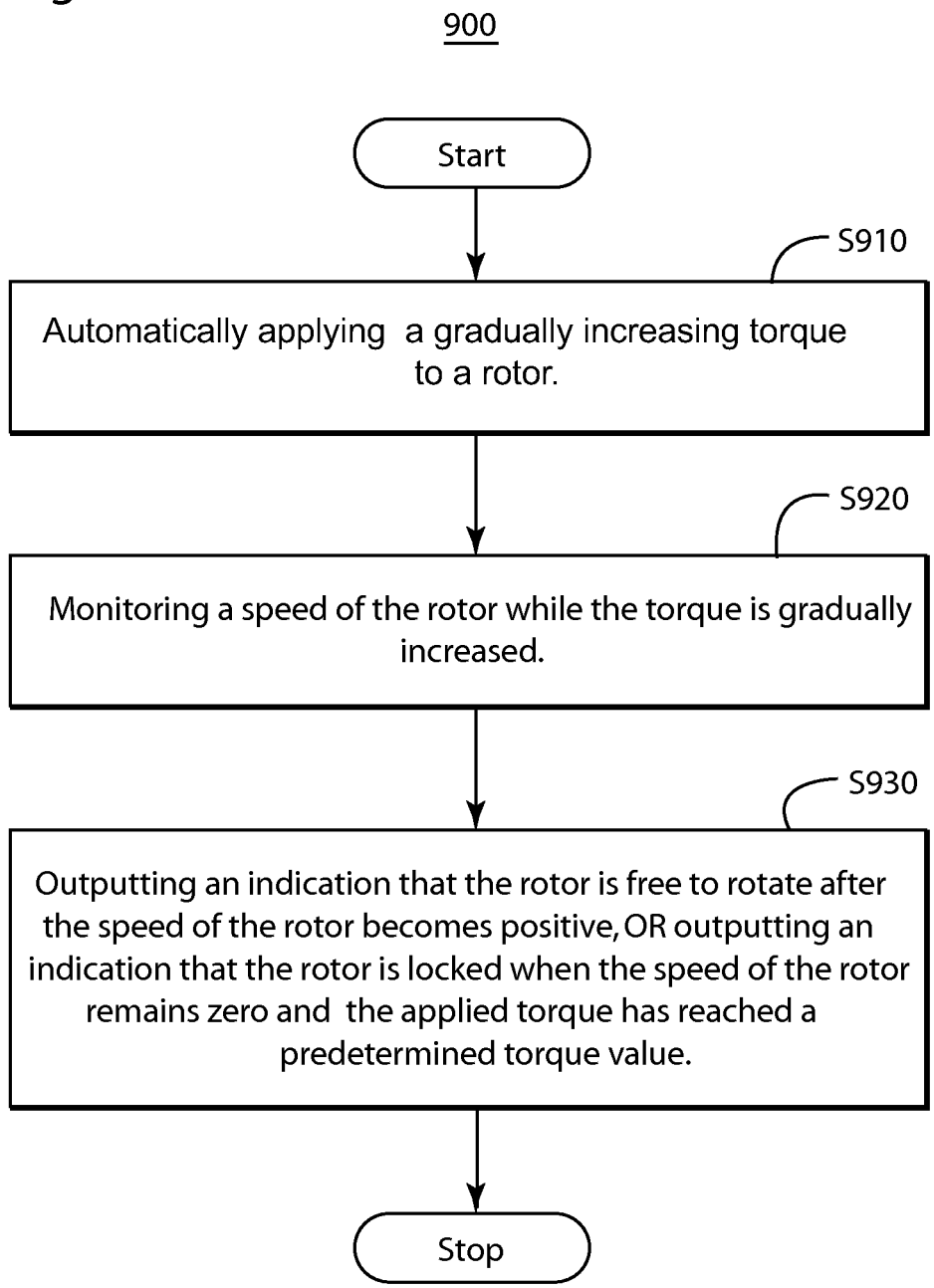

METHODS AND DEVICES FOR LOW SPEED LOW TORQUE TESTING OF A ROTOR IN A TURBOMACHINERY

BACKGROUND OF THE INVENTION

1. Field of the Invention

Embodiments of the subject matter disclosed herein generally relate to systems, methods and devices capable to automatically perform a low torque low speed test in order to determine whether a rotor of a turbomachinery is free to rotate.

2. Description of Related Art

A cooling process of a turbomachinery starts as soon as the turbomachinery is stopped. The cooling process is not uniform, as an outside of the turbomachinery usually cools faster than its center, where a turbomachinery's rotor is located. Therefore, the rotor may become locked, unable to rotate freely. The locking is transient, disappearing when the cooling is complete. However, sometimes operators need to restart the turbomachinery without waiting for a complete cooling, which is a situation known as a hot restart.

A conventional turbomachinery 1 is illustrated in FIG. 1. In the turbomachinery 1, a rotor inside an axial compressor 10 and a turbine 20 can rotate due to a torque received via an inlet gear box 30. The inlet box 30 is configured to receive a torque from a transfer gear box 40, which is further connected to an accessory gear box 50. The accessory gear box 50 may receive a torque from a maintenance pad 60 or from a starter 80 via an overrunning clutch 70.

In order to make sure that the rotor can rotate freely, thereby to avoid damaging the rotor or other components of the turbomachinery 1, conventionally, prior to a hot restart, an operator tests manually whether the rotor is free to rotate. To do this, the operator enters the turbomachinery's enclosure (not shown) and gains access to the maintenance pad 60 by dismantling a cover of the maintenance pad 60. Then the operator uses a dynamometric tool to apply a torque to the rotor, the torque having value up to a predetermined torque value. The applied torque is transmitted from the accessory gearbox 50 to the rotor of the turbomachinery 1 via the transfer gearbox 40 and the inlet gearbox 30. If the rotor rotates, the test is considered successful. Otherwise, a hot restart is not possible until the turbomachinery 1 cools further, so that the rotor becomes free to rotate. If the test is successful, the operator reassembles the cover of the maintenance pad 60 and leaves the turbomachinery's enclosure.

Such a manual test takes a relative long time. Additionally, it is possible that after the completion of the test, but prior to restarting the turbomachinery, the rotor to become locked since the cooling continues.

Accordingly, it would be desirable to provide systems and methods that avoid the afore-described problems and drawbacks.

BRIEF SUMMARY OF THE INVENTION

According to one exemplary embodiment, a turbomachinery includes a rotor and a starting apparatus configured to be connected to the rotor. The starting apparatus includes a torque generator device configured to generate a torque to be transmitted to the rotor, and a controller connected to the torque generator device. The controller is configured to automatically (i) control the torque generator device to output a gradually increasing torque, (ii) monitor a speed of the rotor while the torque is gradually increased, and (iii) output an indication that the rotor is free to rotate after the speed of the rotor becomes positive, or to output an indication that the rotor is locked when the speed of the rotor remains zero and the torque has reached a predetermined torque value.

According to another exemplary embodiment, a starting apparatus configured to start a turbomachinery includes a torque generator device configured to generate a torque to be transmitted to a rotor of the turbomachinery, and a controller connected to the torque generator device. The controller is configured to automatically (i) control the torque generator device to output a gradually increasing torque, (ii) monitor a speed of the rotor while the torque is gradually increased; and (iii) output an indication that the rotor is free to rotate after the speed of the rotor becomes positive, or to output an indication that the rotor is locked when the speed of the rotor remains zero and the torque has reached a predetermined torque value.

According to another exemplary embodiment, a method of performing a low torque test to determine whether a rotor in a turbomachinery is free to rotate is provided. The method includes automatically applying a gradually increasing torque to the rotor. The method further includes monitoring a speed of the rotor while the torque is gradually increased. The method also includes outputting an indication that the rotor is free to rotate after the speed of the rotor becomes positive, or outputting an indication that the rotor is locked when the speed of the rotor remains zero and the applied torque has reached a predetermined torque value.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 5 is a flow diagram of a method of automatically performing a low speed low torque test according to an exemplary embodiment;

FIG. 12 is a flow diagram of a method of automatically performing a low speed low torque test according to another exemplary embodiment.

DETAILED DESCRIPTION OF THE INVENTION

The following description of the exemplary embodiments refers to the accompanying drawings. The same reference numbers in different drawings identify the same or similar elements. The following detailed description does not limit the embodiments of the invention. Instead, the scope of the embodiments of the invention is defined by the appended claims. The following embodiments are discussed, for simplicity, with regard to the terminology and structure of a turbomachinery including a rotor. However, the embodiments to be discussed next are not limited to these systems, but may be applied to other systems that require testing of whether a rotor is free to rotate prior to a hot restart.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
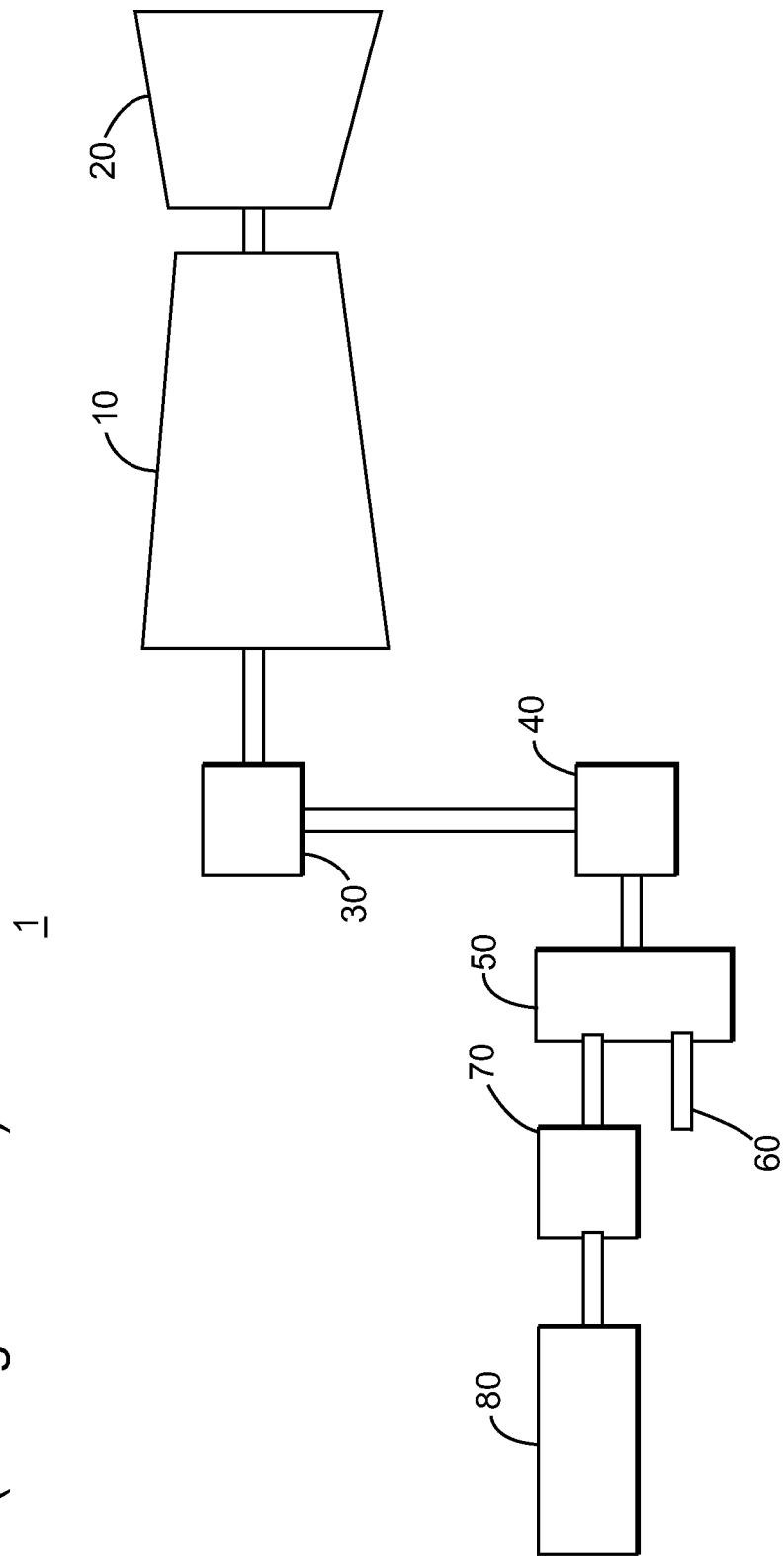
FIG. 1 is a schematic diagram of a conventional turbomachinery.
Figure 2:
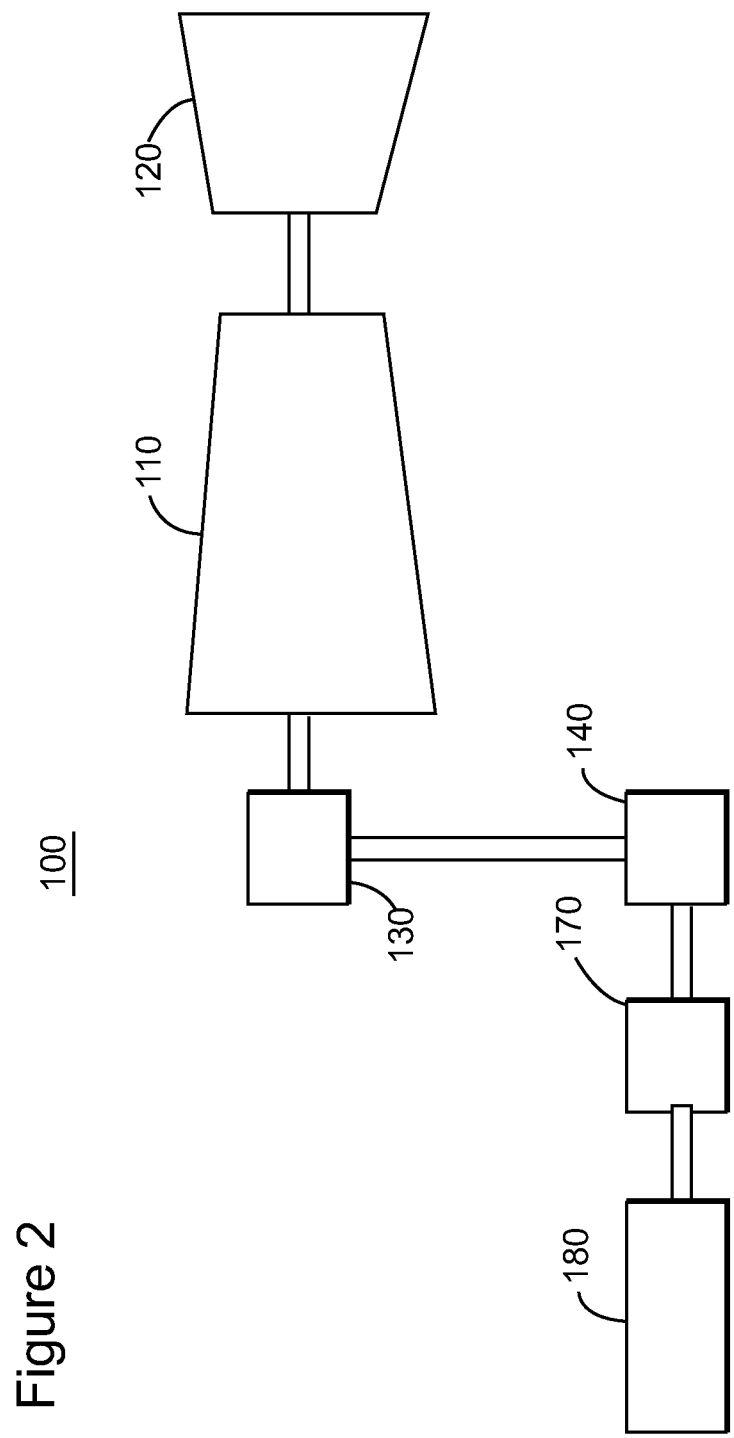
FIG. 2 is a schematic diagram of a turbomachinery according to an exemplary embodiment.

FIG. 2 is a schematic diagram of a turbomachinery 100 according to an exemplary embodiment. In the turbomachinery 100, a rotor located inside a compressor 110 and a turbine 120 can rotate due to a torque received via an inlet gearbox 130, a transfer gearbox 140, and a clutch 170 from a starter 180. A person skilled in the art would understand that the automatic testing prior to a hot restart may be applied for various turbomachineries.

Figure 3:
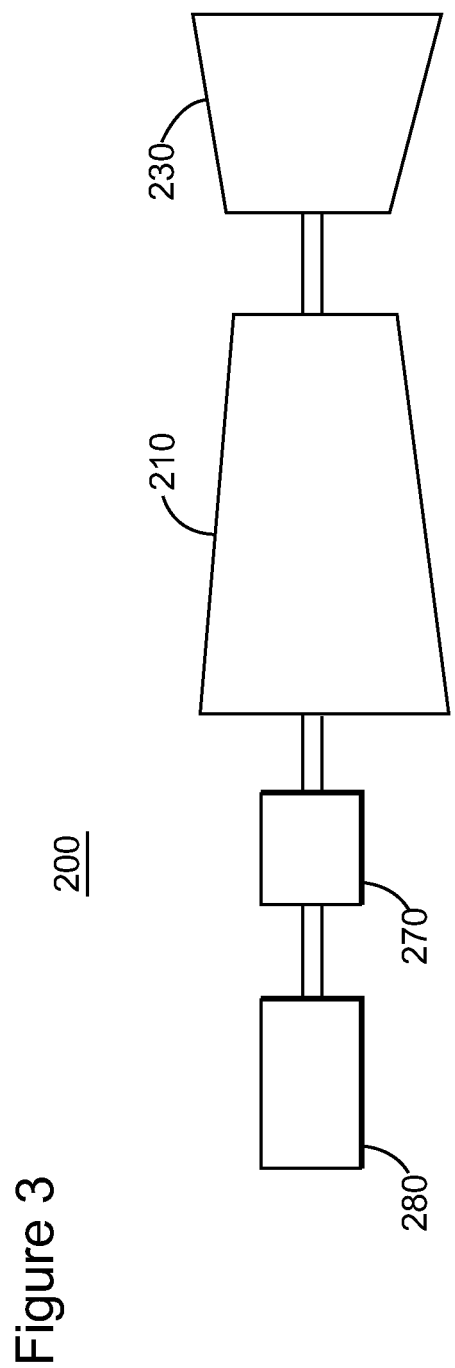
FIG. 3 is a schematic diagram of a turbomachinery according to another exemplary embodiment.

In another embodiment illustrated in FIG. 3, in a turbomachinery 200, a rotor inside a compressor 210 and a turbine 230 can rotate due to a torque received via a clutch 270 from a starter 280.

Figure 4:
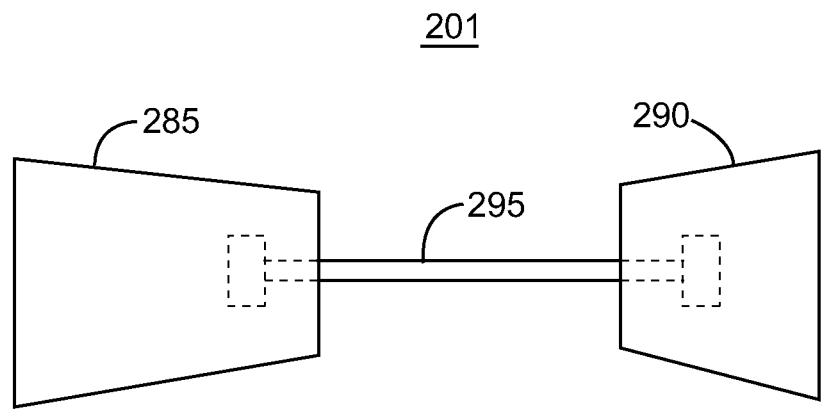
FIG. 4 is a schematic diagram of a compressor-turbine system having a rotor inside according to another exemplary embodiment.

FIG. 4 illustrates a system 201 including a compressor 285 and a turbine 290. A rotor 295 may be a single piece having an impeller inside the compressor 285 and rotor blades inside the turbine 290. The impeller and the rotor blades being disposed on a single shaft rotate simultaneously, thereby allowing energy produced by burning of a fuel air mixture inside the turbine 290, to be used to increase a fluid flow pressure inside the compressor 285.

The starters 180 and 280 are configured to control the turbomachinery 100 and 200, respectively, through a sequence of operations which constitute a low speed low torque test. Based on the speed low torque test, whether the rotor of the turbomachinery is free to rotate is determined. If the low speed low torque test indicates that the rotor is free to move, a hot restart may be initiated.

FIG. 5 illustrates a flow diagram of a method 300 of automatically performing a low speed low torque test according to an exemplary embodiment. A starting apparatus connected in a turbomachinery (like either starter 180 or starter 280) may include a torque generator device and a controller. The controller is configured to the torque generator device to output a torque that is transmitted to the rotor. However, the controller may be placed outside the starting apparatus (i.e., the torque generator device and the controller may be separate devices at separate locations). At step S310, the torque generator device is activated to output a torque to the rotor.

At S320, the controller controls the torque generator device to output an increasing torque that is transmitted to the rotor. The value of the torque increases gradually up to a predetermined torque value $\tau_{limit}$. The predetermined torque value $\tau_{limit}$ is a value substantially lower than a torque occurring during a normal operation. When torques having values lower than $\tau_{limit}$ are transmitted to the rotor, the rotor rotates at low speeds, which are substantially lower than a normal operation speed. Thus, compared to a normal operation, the test is performed at a low torque and a low speed. Thus, if the rotor is locked, the test subjects the rotor and components surrounding or coupled to the rotor to less stress than the amount of stress that would occur in case of a failed attempt to operate the rotor in normal operation ranges.

The increasing of the torque may be stepwise or at a predetermined torque increase rate. In a hydraulic starter, the torque increase may occur as a result of an oil pressure increase. A delay may occur between when the oil pressure starts to increase and when the torque starts to increase. The oil pressure may increase stepwise or at a constant rate, and may yield a non-uniform, although gradual increase of the torque. If the torque increase is a result of a stepwise manner of operating the system, steps S330 and S350 following S320 may be performed after one step increase of the oil pressure or once for a predetermined number of steps of increase of the oil pressure. Either the torque increases uniform or non-uniform, S320, S330 and S350 may be performed one after another, as a looping sequence of commands. Alternatively, S320, S330 and S350 may be executed in parallel (not shown), and then a "YES" result at S330 or S350 would end the torque increase.

At S330, the torque is compared with the predetermined torque value $\tau_{limit}$. If the torque has exceeded $\tau_{limit}$ ("YES" branch at S330), the result of the test is that the rotor is locked, not able to rotate without damaging the turbomachinery. The torque generator device is then stopped at S340 and the controller outputs an indication that the rotor is locked.

If the torque has not exceeded $\tau_{limit}$ ("NO" branch at S330), a rotating speed of the rotor acquired, for example, from a sensor located close to the rotor is compared with a "zero" speed value. The "zero" speed value may take into consideration the accuracy of a speed measurement to prevent a false positive. Another way to prevent a false positive result is to continue increasing the speed for a predetermined interval or up to a predetermined speed value.

If the rotating speed of the rotor is positive ("YES" branch at S350), the result of the test is that the rotor is free to move. The torque generator device is then stopped at S360, and the controller outputs an indication that the rotor is free, thereby, the machinery being ready for a hot restart.

The indications output at S340 and S360 may be a signal triggering subsequent operations, a message visible to the operator, etc. Following the outputting of one of the indications, the controller controls the torque generator device to stop outputting the torque. However, when the indication is that the rotor is free, the controller may then control the torque generator device to output a torque for a normal operation or hot restart of the turbomachinery.

If the rotating speed of the rotor is not positive ("NO" branch at S350), S320 follows, that is, the torque to be applied to the rotor is increased.

Figure 6A:
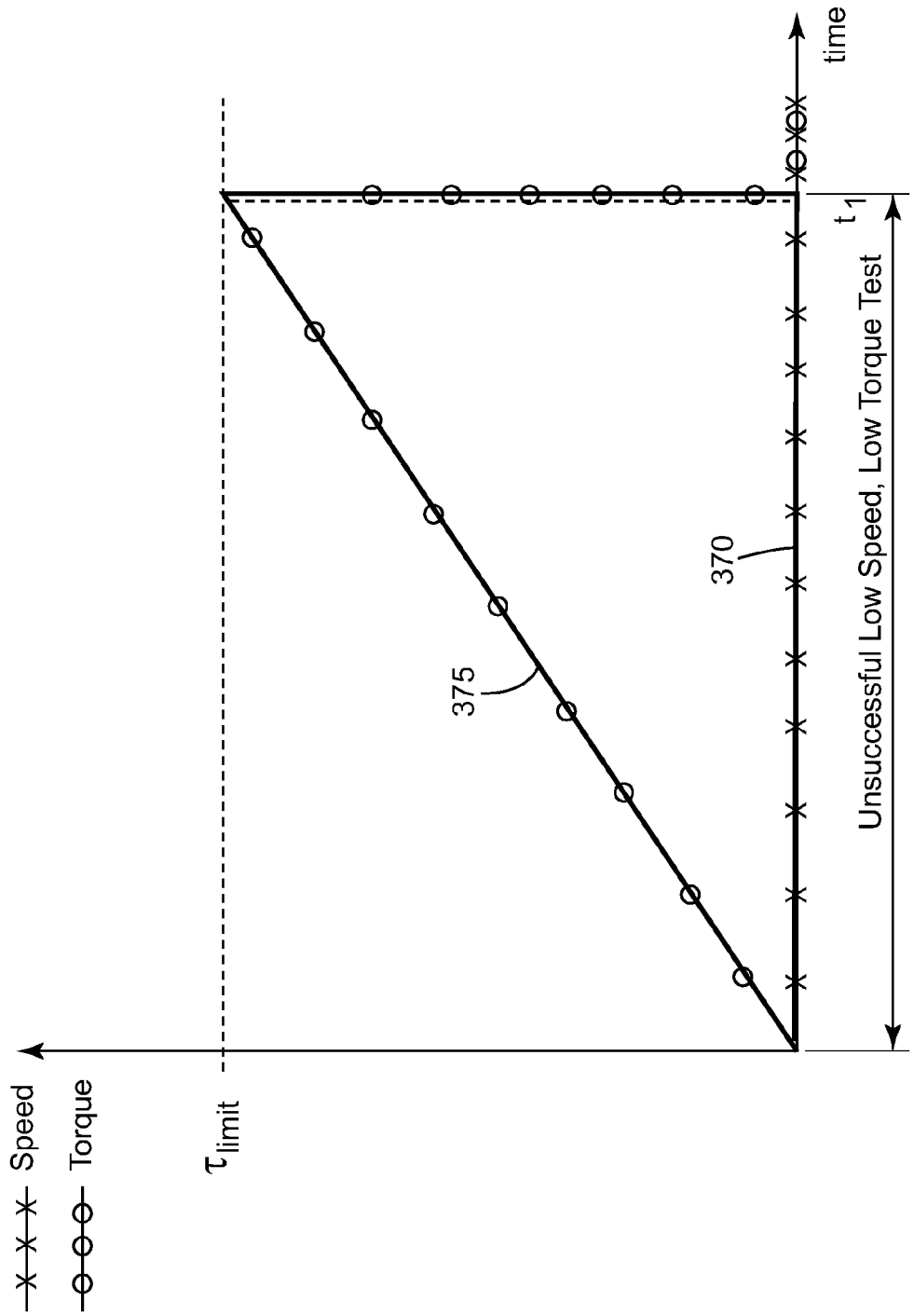
FIG. 6A is a graph of torque and rotor speed versus time related to an unsuccessful low speed low torque test according to an exemplary embodiment.
Figure 6B:
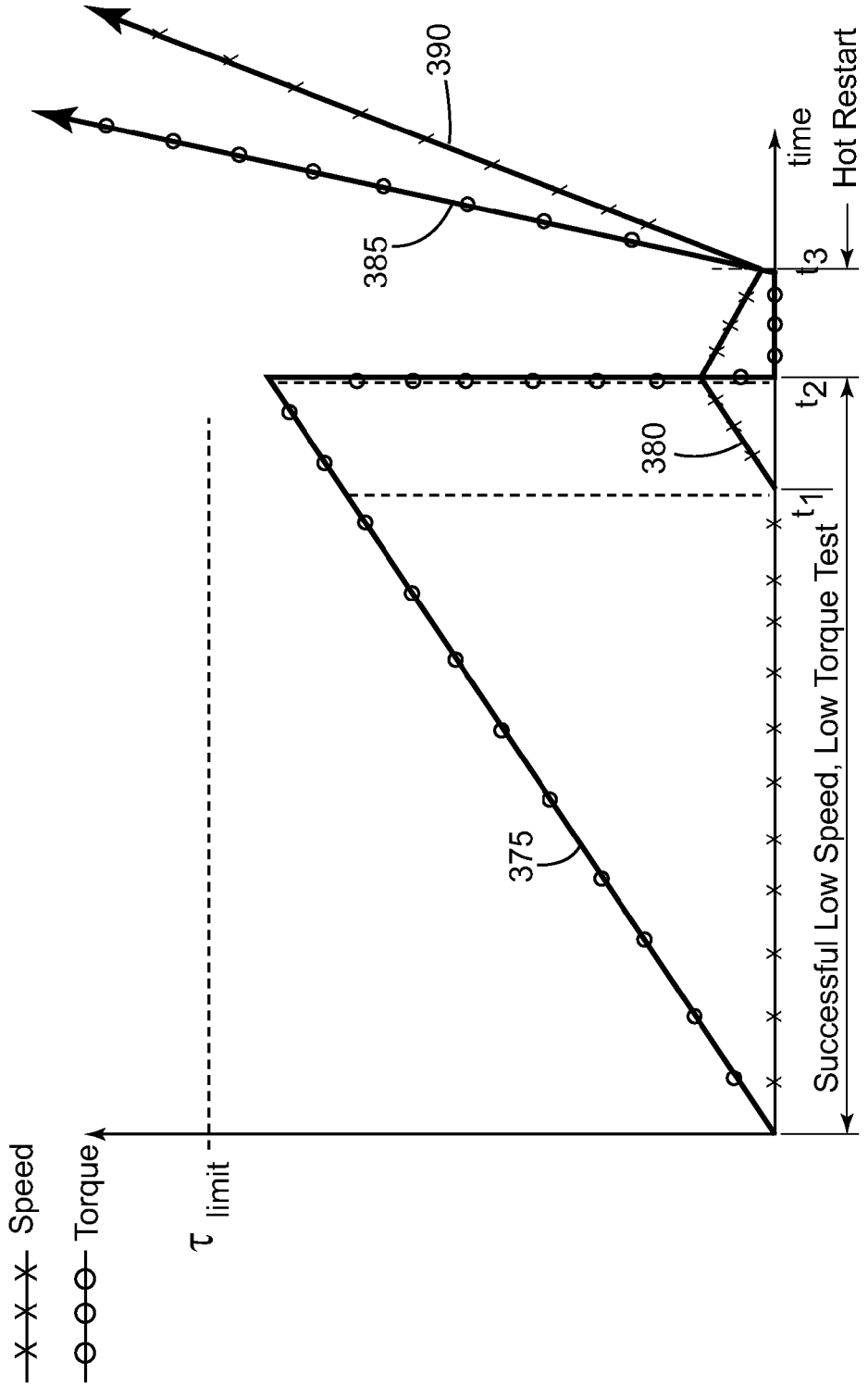
FIG. 6B is a graph of torque and rotor speed versus time related to a successful low speed low torque test according to an exemplary embodiment.

FIGS. 6A and 6B are graphs of the torque and the rotor speed (in arbitrary units) versus time illustrating an unsuccessful and a successful low speed low torque test, respectively.

In FIG. 6A, the rotor is determined to be locked, unable to rotate. Line 370 represents the rotor speed, which remains zero throughout the low torque low speed test (i.e., up to $t_1$), in spite of the increasing torque represented by line 375. Once the torque reaches $\tau_{limit}$, the test ends indicating that the test was unsuccessful and therefore a hot restart is not possible.

In FIG. 6B, the rotor is determined to be free to rotate. Line 375 represents the increasing torque. The rotor speed (line 380) becomes positive at $t_1$. After the rotor speed (line 380) becomes positive, the increase of the torque may continue for a predetermined time or until the rotor speed reaches a predetermined speed value, in order to avoid a false positive result of the test. If the rotor speed remains positive during the predetermined time or reaches the predetermined speed value, the increasing of the torque ends at $t_2$ even if the torque at $t_2$ is lower than $\tau_{limit}$. A hot restart may begin at $t_3$, before the rotor comes to a complete stop following the low torque low speed test. The controller may automatically control the torque generator device to ramp up torque values for a normal operation after a predetermined time interval $t_3$-$t_2$, or, an operator may issue a normal operation command upon receiving the indication that the low torque low speed test has been successful.

At the end of the low torque low speed test, the torque applied to the rotor may decrease at a predetermined rate. In FIG. 6B, the torque between $t_2$ (the end of the low torque low speed test) and $t_3$ (the beginning of ramping up the applied torque towards a normal operation value) is illustrated at zero, but a person of ordinary skill would recognize that the zero value is not a limitation, a small non-zero value, or a ramping down of the torque may occur between $t_2$ and $t_3$.

Restarting the turbomachinery for a normal operation after a successful low torque low speed test before the rotor stops has the advantage of precluding a locking of the rotor between the test and the restart.

The torque applied during the hot restart (line 385 after $t_3$ in FIG. 6B) increases at a substantial higher rate than during the test (line 375), to torque values substantially larger than $\tau_{limit}$. The rotor speed during the hot restart (line 390 in FIG. 6B) increases substantially faster, to substantially higher speed values than during the test.

The starters 180 and 280 (i.e., torque generator device) performing a method similar to the method illustrated in FIG. 5 may include a hydraulic starter system, an expander starter system (with compressed gas or air) or an electric starting system.

Figure 7:
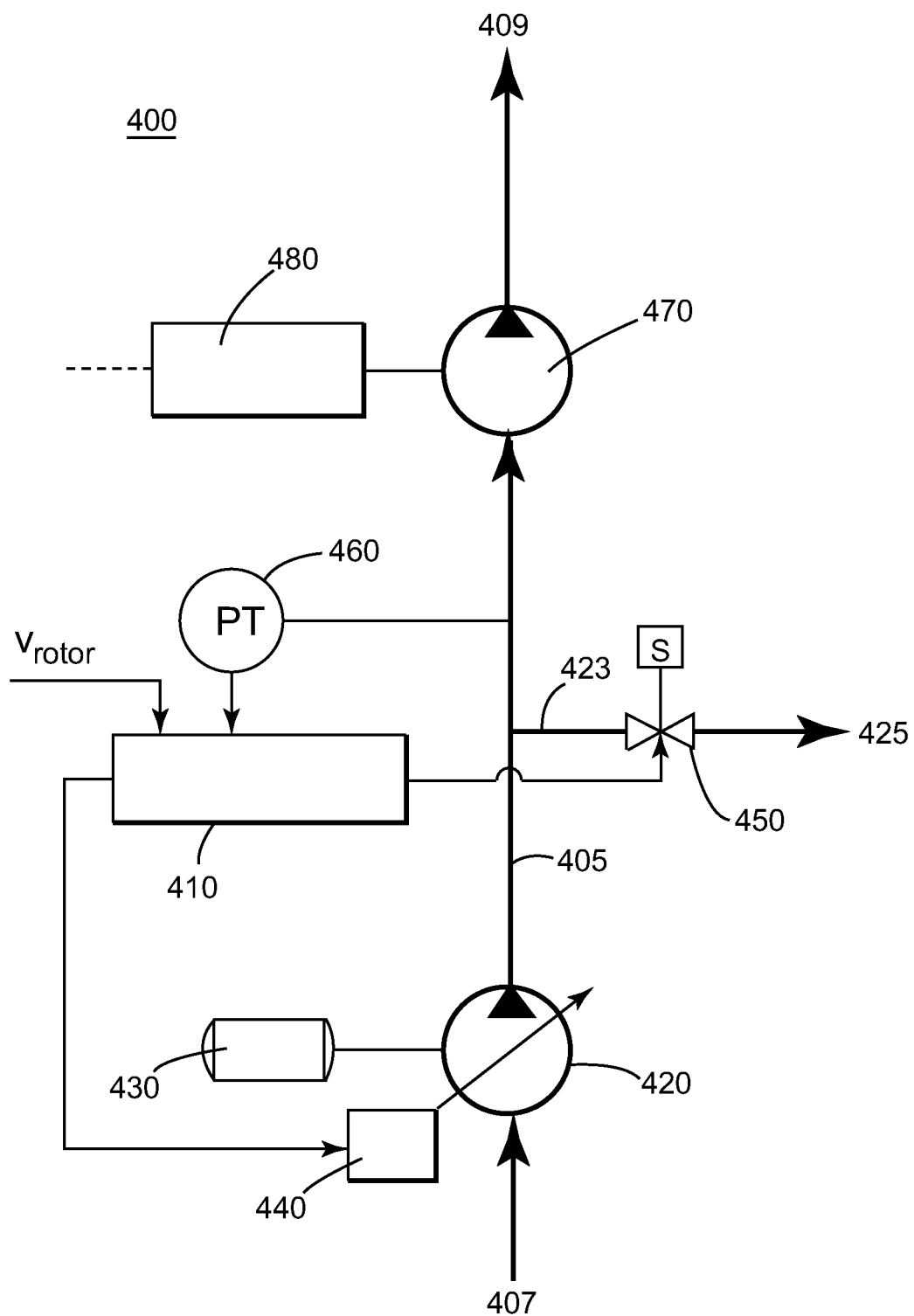
FIG. 7 is a schematic diagram of a hydraulic starter system according to an exemplary embodiment.

A hydraulic starter system 400 according to an exemplary embodiment is illustrated in FIG. 7. A torque value of the torque output by the hydraulic starter system 400 depends on the pressure of oil in an oil pipe line 405. A controller 410 is configured to receive information regarding the speed of the rotor ($v_{rotor}$) and the pressure of the oil in the oil pipe line 405.

Along the oil pipe line 405, between an oil supply 407 and an oil return 409, it is located a hydraulic pump 420 driven by an electric motor 430. The amount and pressure of the oil pumped by the hydraulic pump 420 depends on a state of a pump stroke actuator 440 and a fixed flow in the area of an open damp valve 450 (i.e., increasing the hydraulic pump 420 flow causes the pressure in the pipe line to increase). The controller 410 is configured to control the pump stroke actuator 440 and the open damp valve 450 in order to perform automatically a low torque low speed test.

Downstream from the hydraulic pump 420, on a diverting pipe 423 towards an oil drain 425, the damp valve 450 may be opened when the hydraulic starter system 400 is stopped. A pressure sensor 460 measures the pressure of the oil input to a hydraulic starter 470, which may be connected to a clutch 480. The clutch 480 may correspond to the clutch 170 or 270 in FIGS. 2 and 3, respectively. The oil leaving the hydraulic starter 470 is piped towards the oil return 409.

Figure 8:
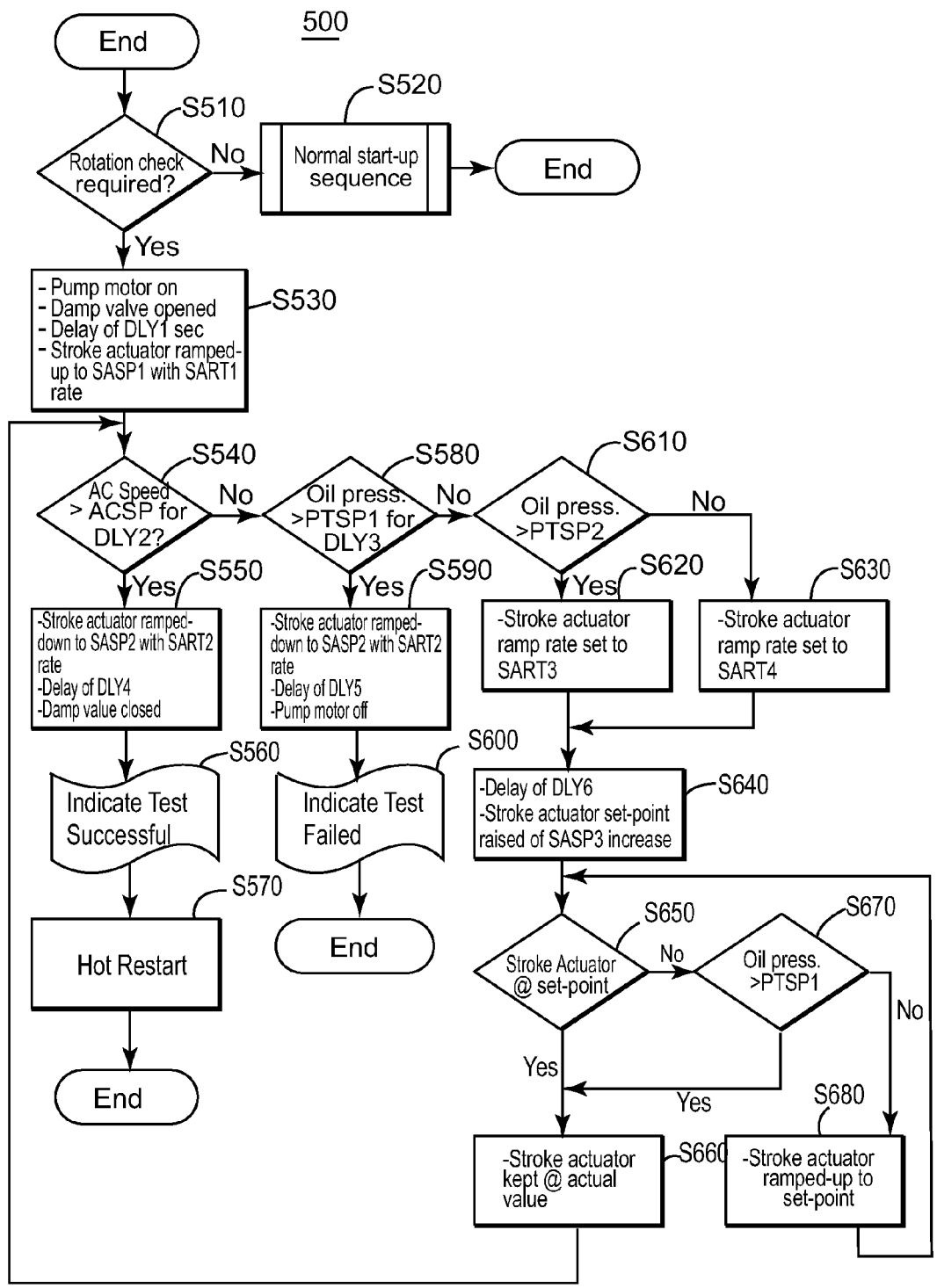
FIG. 8 is a flow diagram of a method of automatically performing a low speed low torque test using a hydraulic starter according to an exemplary embodiment.

FIG. 8 illustrates a flow diagram of a method 500 of automatically performing a low speed low torque test using a hydraulic starter system (e.g., the hydraulic starter system 400 of FIG. 7). The method 500 may be implemented by hardware, software or a combination thereof.

At step S510, an assessment of whether a rotation check (i.e., performing the low speed low torque test) is necessary. For example, performing the test is necessary when a hot restart is intended. An operator may also issue a command for performing the low speed low torque test, prior to a normal start-up sequence, for example, shortly after an installation of the turbomachinery. If the test is deemed not necessary ("NO" branch at S510), a normal startup sequence may be initiated at S520.

If the test is deemed necessary ("YES" branch at S510), at S530, the pump motor (e.g., 430 in FIG. 7) is turned ON, the damp valve (e.g., 450 in FIG. 7) is opened, and, after a predetermined delay DLY1, the oil pressure is increased (as measured, e.g., by the sensor 460 in FIG. 7) by ramping-up the stroke actuator (e.g., 440 in FIG. 7) to a first stroke value SASP1, with a stroke increase rate SART1. For example, the predetermined delay DLY1 may be 17 s, the first stroke value SASP1 may be 15%, and the stroke increase rate SART1 may be 0.625%/s. These and other stroke related values represent percentages of a maximum stroke value. A person of ordinary skill in the art would understand that these values and other values cited when describing the flow diagram in FIG. 8, depend on the particularities of the components of the hydraulic starter system, and are not intended to limit the scope of applying the low speed low torque test in a hydraulic starter.

At S540, an assessment as to whether the rotor speed AC (e.g., measured by a sensor located near the rotor) has been larger than a predetermined speed value ACSP for a predetermined time DLY2 is performed. For example, the predetermined speed value ACSP may be 120 rpm, and DLY2 may be 10 s. The low torque low speed test is successful when the rotor speed is larger than ACSP for DLY2.

If the result of the assessment at S540 is positive (i.e., "YES" branch of S540), the test is successful. Then, at S550, the pressure is decreased by ramping down the stroke actuator to SAP2 with a rate SART2, and after a delay DLY4, the damp valve is closed. For example, SAP2 may be 0% and SART2 may be 15%/s and DLY4 may be 1 s. At S560, which follows S550, the starter system signals that the test is successful, and a hot restart may follow at S570.

If the result of the assessment at S540 is negative (i.e., "NO" branch of S540), at S580, an assessment as to whether the oil pressure (e.g., measured by sensor 460 in FIG. 7) has been larger than a reference pressure value PTS1 for a time period DLY3 is performed. For example, PTS1 may be 90 bar gauge (corresponding to 91.013 bar absolute) and DLY3 may be 10 s. The oil pressure being larger than a reference pressure value PTS1 for a time period DLY3 indicates that the torque applied via the overrunning clutch (e.g., 480 in FIG. 7) has reached the limit value.

If the result of the assessment at S580 is positive (i.e., "YES" branch of S580), the low torque low speed test has failed. Then, at S590, the stroke actuator is ramped down to SAP2 with a rate SART2 causing the pressure to decrease, and, after a delay DLY5, the pump motor is turned OFF. For example, DLY5 may be 15 s. At S600, which follows S590, the starter system indicates that the test has failed.

If the result of the assessment at S580 is negative (i.e., "NO" branch of S580), at S610, the oil pressure is compared with a predetermined pressure value PTSP2. For example, PTSP2 may be 10 bar gauge (corresponding to 11.013 bar absolute). If the oil pressure is larger than PTSP2 (i.e., "YES" branch of S610), at S620, the stroke actuator ramp up rate is set to SART3. If the oil pressure is not larger than PTSP2 (i.e., "NO" branch of S610), at S630, the stroke actuator ramp up rate is set to SART4. Thus, the stroke actuator rate is determined by the oil pressure. When the oil the pressure is below PTSP2, the actuator rate is SART4, otherwise the actuator rate is SART3 to avoid abrupt oil pressure variations. For example, SART3 may be 0.0625% and SART4 may be 0.625%.

At S640, which follows S620 or S630, a delay DLY6 is observed in order to allow the oil pressure to stabilize, and then, the pressure is increased by ramping up the stroke actuator set point rate with a step of value SASP3. For example, SASP3 may be 1.25% and DLY6 may be 5 s.

Then, at S650, an assessment as to whether the stroke actuator position is at the set point is performed. If the stroke actuator is at the set point (i.e., branch "YES" of S650), the stroke actuator is maintained at the current position at S660 and then, S540 is performed again.

If the stroke actuator position is still lower than the set point (i.e., branch "NO" of S650), the oil pressure is compared with PTSP1 at S670. If the comparison indicates that the oil pressure is larger than PTSP1 (i.e., branch "YES" of S670), then S660 is performed. If the comparison indicates that the oil pressure is not larger than PTSP1 (i.e., branch "NO" of S670), the stroke actuator is ramped up towards the set-point at S680, and S650 is performed again.

Figure 9:
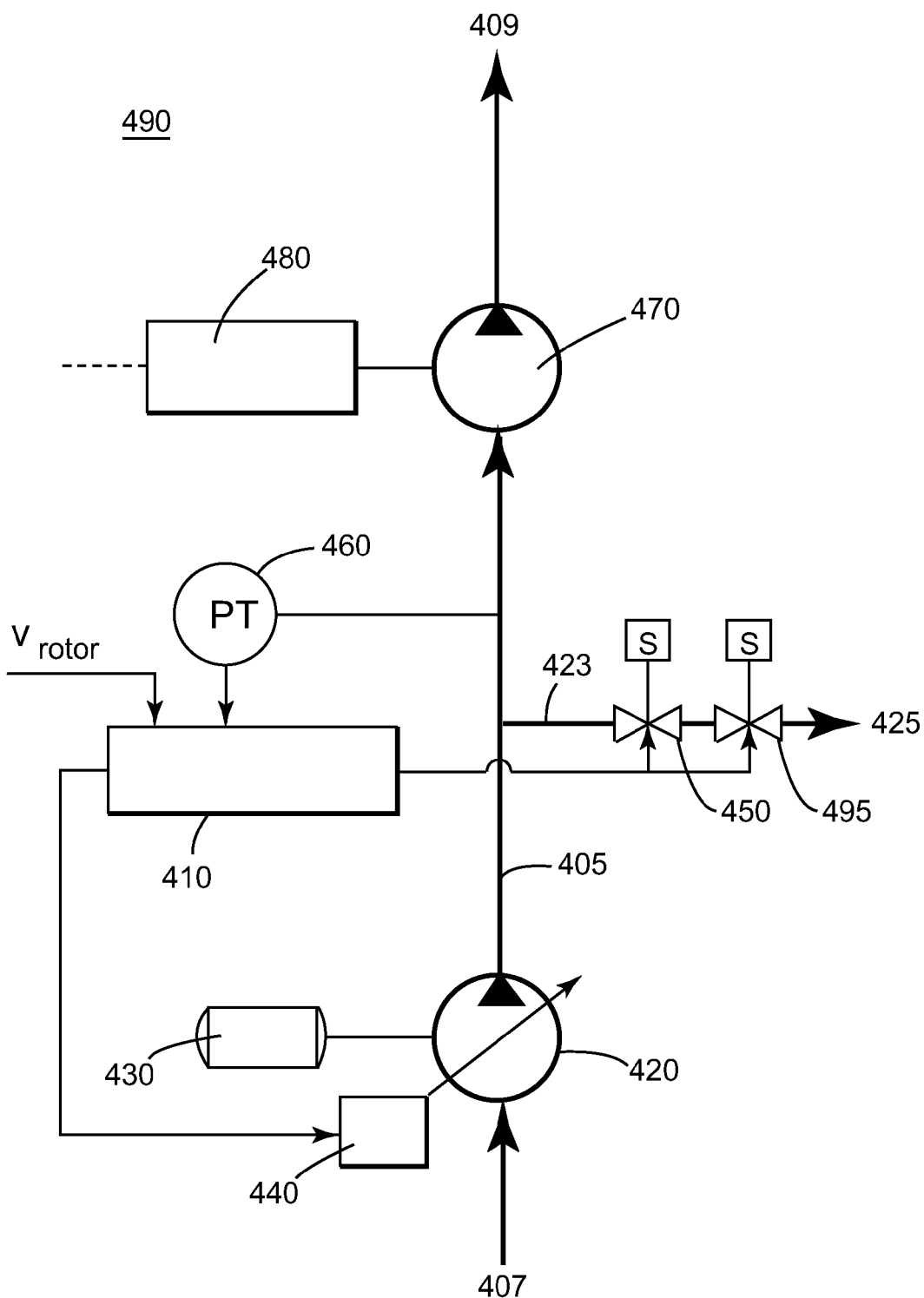
FIG. 9 is a schematic diagram of another hydraulic starter system according to an exemplary embodiment.

FIG. 9 illustrates an alternative embodiment of a hydraulic starter system 490, including a controller 410, which has an alternate leverage in controlling the oil pressure due to a throttling valve 495 located on the pipe towards the oil drain. The amount of the oil pumped by the hydraulic pump 420 depends on a state of the pump stroke actuator 440 and the pressure by the variable flow area of throttling valve 495 (i.e., setting a fixed hydraulic pump 420 flow and reducing the 495 valve flow area cause the oil pressure to increase).

Figure 10:
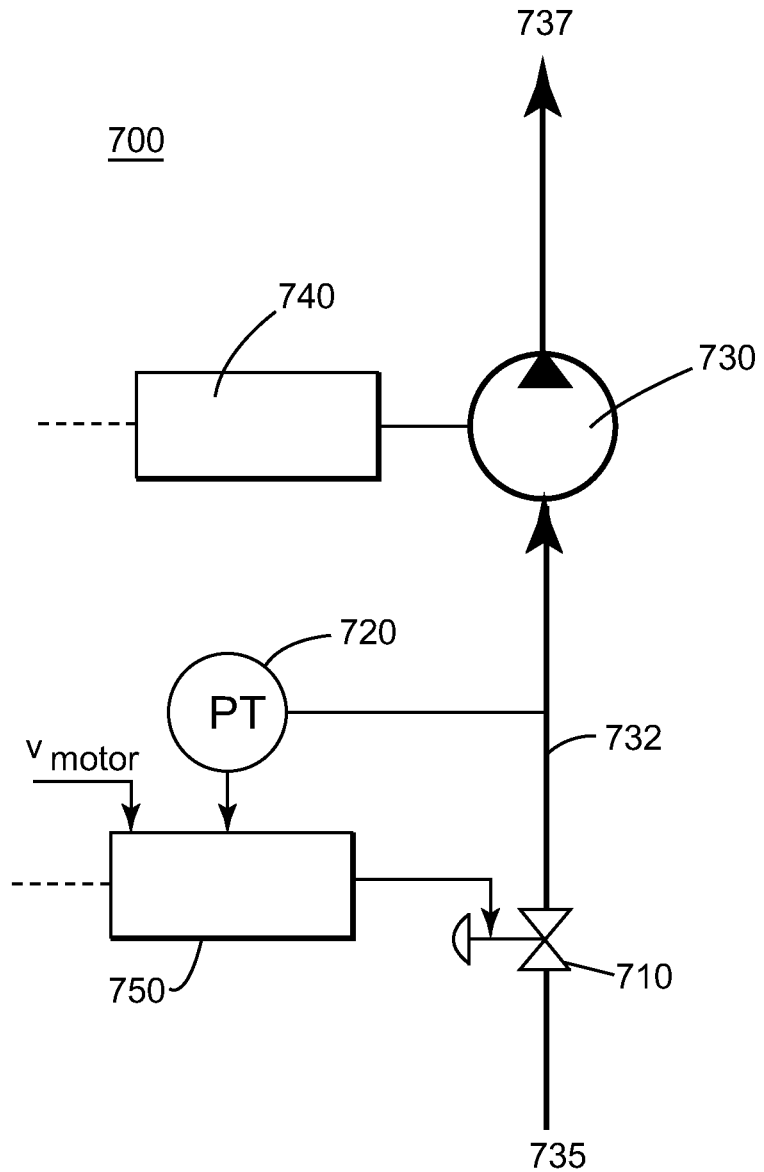
FIG. 10 is a schematic diagram of a gas or air expander starting apparatus according to an exemplary embodiment.

According to another embodiment, an automatic low speed low torque test may also be performed using an expander starting apparatus 700 as illustrated in FIG. 10. In the expander starting apparatus 700, a pressure control valve 710, a pressure sensor 720 and an expander starter 730 are arranged on a pipe 732 between a compressed gas supply 735 and a vent 737. The expander starter 730 provides a torque to a clutch 740 (that may correspond to the overrunning clutch 180 and 280). The torque value is determined by the flow and/or pressure of the compressed air reaching the expander starter 730. A controller 750 is configured to receive information about the speed of the rotor ($v_{rotor}$) and a pressure of the compressed air reaching the expander starter 730 from the pressure sensor 720. The controller 750 is also configured to control the pressure valve 710 in order to perform a low speed low torque test (e.g., 300 in FIG. 5).

Figure 11:
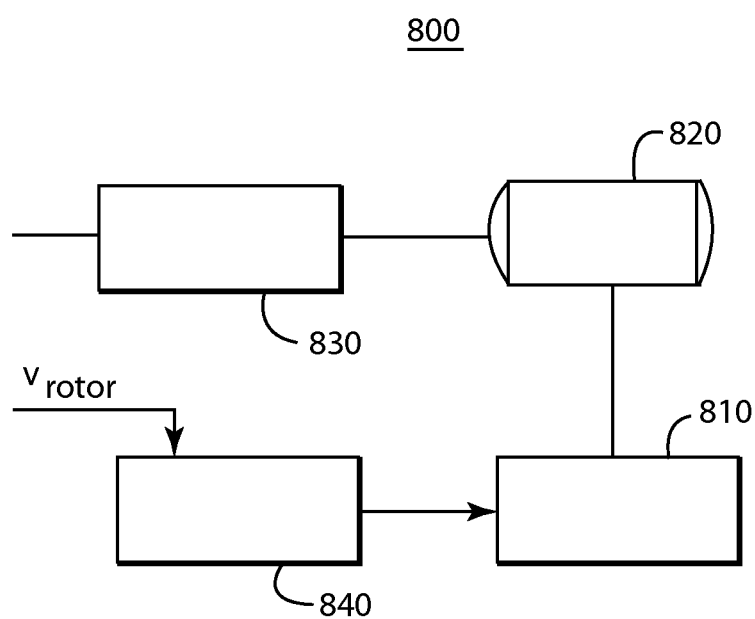
FIG. 11 is a schematic diagram of an electric starting apparatus according to an exemplary embodiment.

According to another embodiment, an automatic low speed low torque test may be performed using an electric starting apparatus as illustrated in FIG. 11. In the electric starting apparatus 800, a controller 840, which receives information about the speed of the rotor ($v_{rotor}$), may control a power supply 810 that supplies power to an electric starter 820. The electric starter 820 generated a torque to be provided to the rotor via a clutch 830 (that may correspond to the clutch 180 or 280 in FIGS. 2 and 3, respectively) in order to perform a low speed low torque test (e.g., 300 in FIG. 5).

FIG. 12 is a flow diagram of a method 900 of automatically performing a low speed low torque test according to another exemplary embodiment. The method 900 includes automatically applying a torque to the rotor, the torque gradually increasing up to a predetermined torque value, at S910. Further the method includes monitoring a speed of the rotor, while the torque is gradually increased, at S920. Then, the method 900 includes outputting an indication that the rotor is free to rotate after the speed of the rotor becomes positive, or outputting an indication that the rotor is locked when the speed of the rotor remains zero and the applied torque has reached the predetermined torque value, at S930.

Some of the embodiments have the advantage that a time necessary to determine whether a rotor of a turbomachinery is free to rotate is shortened. Performing automatically the low torque low speed test lowers the risk of damage associated with attempting a hot restart while the rotor is locked.

The disclosed exemplary embodiments provide systems, devices and methods for automatically performing a low torque low speed test to determine whether a rotor of a turbomachinery is free to rotate. It should be understood that this description is not intended to limit the embodiments of the invention. On the contrary, the exemplary embodiments are intended to cover alternatives, modifications and equivalents, which are included in the spirit and scope of the embodiments of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A turbomachinery, comprising:
a rotor; and
a starting apparatus configured to be connected to the rotor, and including
a torque generator device configured to generate a torque to be transmitted to the rotor; and
a controller connected to the torque generator device and configured to automatically (i) control the torque generator device to output a gradually increasing torque, (ii) monitor a speed of the rotor while the torque is gradually increased, and (iii) output an indication that the rotor is locked when the speed of the rotor remains zero and the torque has reached a predetermined torque value.

2. The turbomachinery of claim 1, wherein the starting apparatus is configured to restart the turbomachinery after the indication that the rotor is free to rotate has been output.

3. The turbomachinery of claim 1, wherein the controller is configured to control the torque generator device to continue applying the torque for a predetermined time while the speed of the rotor is positive, before outputting the indication that the rotor is free to rotate.

4. The turbomachinery of claim 1, further comprising:
a rotation transmission assembly connected between the torque generator device and the rotor and configured to transmit the torque from the torque generator device to the rotor.

5. The turbomachinery of claim 1, wherein the starting apparatus is a hydraulic device.

6. The turbomachinery of claim 1, wherein the torque generator device is an expander.

7. The turbomachinery of claim 1, wherein the starting apparatus is an electric device.

8. A starting apparatus configured to start a turbomachinery, the starting apparatus comprising:
   a torque generator device configured to generate a torque to be transmitted to a rotor of the turbomachinery; and
   a controller connected to the torque generator device and configured (i) to control the torque generator device to output a gradually increasing torque, (ii) to monitor a speed of the rotor while the torque is gradually increased; and (iii) output an indication that the rotor is locked when the speed of the rotor remains zero and the torque has reached the predetermined torque value.

9. The starting apparatus of claim 8, wherein the starting apparatus is configured to restart the turbomachinery after the indication that the rotor is free to rotate has been output.

10. The starting apparatus of claim 8, wherein the controller is configured to control the torque generator device to continue applying the torque for a predetermined time while the speed of the rotor is positive, before outputting the indication that the rotor is free to rotate.

11. The starting apparatus of claim 8, further comprising:
   a rotation transmission assembly connected between the torque generator device and the rotor and configured to transmit the torque from the torque generator device to the rotor.

12. The starting apparatus of claim 8, wherein the starting apparatus is a hydraulic device.

13. The starting apparatus of claim 8, wherein the torque generator device is an expander.

14. The starting apparatus of claim 8, wherein the starting apparatus is an electric device.

15. A method of performing a low torque test to determine whether a rotor in a turbomachinery is free to rotate, the method comprising:
   automatically applying a gradually increasing torque to the rotor;
   monitoring a speed of the rotor while the torque is gradually increased; and
   outputting an indication that the rotor is locked when the speed of the rotor remains zero and the applied torque has reached a predetermined torque value.

16. The method of claim 15, further comprising:
   starting a normal operation/hot restart of the turbomachinery after outputting the indication that the rotor is free to rotate, wherein the starting of the normal operation/hot restart occurs before the speed of the rotor becomes zero.

\* \* \* \* \*